United States Patent
Schnapp et al.

(12)

(10) Patent No.: US 6,402,382 B1
(45) Date of Patent: Jun. 11, 2002

(54) INNER CASING OF A BEARING FOR LIMITED LONGITUDINAL MOVEMENT

(75) Inventors: Peter Schnapp, Nürnberg; Thomas Wiesneth, Herzogenaurach, both of (DE)

(73) Assignee: Ina Walzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/557,603

(22) Filed: Apr. 25, 2000

(30) Foreign Application Priority Data

Apr. 26, 1999 (DE) .............................. 29907217

(51) Int. Cl.⁷ ............................................. F16C 29/04
(52) U.S. Cl. ...................................................... 384/49
(58) Field of Search ................... 384/49, 51, 18

(56) References Cited

U.S. PATENT DOCUMENTS 4,544,212 A * 10/1985 Parzefall et al. ............. 308/6 R

FOREIGN PATENT DOCUMENTS

| DE | 1796018 | 9/1959 |
| DE | 3140587 C2 | 4/1983 |
| DE | 3200676 A1 | 7/1983 |
| DE | 3402523 A1 | 8/1985 |
| DE | 3607633 C2 | 9/1987 |

* cited by examiner

*Primary Examiner*—David Fenstermacher
*Assistant Examiner*—Timothy McAnulty
(74) *Attorney, Agent, or Firm*—Volpe and Koenig, P.C.

(57) ABSTRACT

The inner casing (1) of a rollerbearing permitting longitudinal movement over a limited travel path and designed for longitudinally displaceable mounting or guiding of a rod (8) is provided with an inwardly directed projection (9) on each of at least two opposing lateral surfaces (1a, 1c).

4 Claims, 1 Drawing Sheet

INNER CASING OF A BEARING FOR LIMITED LONGITUDINAL MOVEMENT

BACKGROUND

The present invention concerns the inner casing of a roller bearing permitting longitudinal movement over a limited travel path and designed for longitudinally displaceable mounting or guiding of a rod, whereby the inner casing at least partially surrounds the outer contour of the rod with an elastic wall. The wall exhibits at least one roller race running in the longitudinal direction of the rod on each of at least two sections, with rollers acting from the outside on each race. The wall and the roller race have a cushioning effect at least under loading at least in the direction of the rod or lie at least partially against the rod.

Such inner casings are usually employed in the play-free support of longitudinally moveable rods, such as, e.g., shift rods or rails in automotive drives. They are also suitable, however, for all other conceivable applications in which thrust rods are employed. The elastically yielding and pre-tensioning inner casing sits on the rod and is gripped in an outer casing. A series of rollers are positioned between the outer casing and the inner casing. The rollers are usually spaced from each other by a cage. The outer casing and the inner casing are matched in their dimensions such that the rollers roll under pretension between the inner and outer casings. For this purpose, the inner casing is constructionally designed such that its wall is provided with races for the rollers and elastically pretensions the rollers outwardly against the outer casing. The inner casing is supported inwardly against the contour of the shift rod.

Depending on application and loading, the rod is supported in two, three, or more radial directions by one or more series of balls moving in the axial direction.

An inner casing of this type is described in DE 34 02 523 C2. The inner casing is formed from thin sheet metal, slit in the longitudinal direction, and exhibits a ball race on three or four lateral surfaces. The ball races are supported on the wall of the rod. The free ends of the casing bordering the longitudinal slit are provided with locking elements which engage in a corresponding recess in the rod and thus secure the position of the inner casing on the rod. The balls acting on the inner casing are spaced from each other by a cage. In order to limit its longitudinal movement, the cage engages in an opening which is positioned between the two axial ends of the inner casing. The inner casing is produced from thin-walled elastic material.

Bearings for limited longitudinal movement employing such casings in themselves satisfactorily meet the demands involved in play-free support of rods. However, the fact that such inner casings, due to their elasticity, exhibit a soft and somewhat excessive yield when the rods are loaded, particularly with transverse forces, is disadvantageous. Deviations of the shifting elements from their target position are the result. Upon use of such bearings in shift drives, the precision and quality of shift cycles are frequently disadvantageously affected.

SUMMARY

The object of the present invention is therefore to provide an inner casing whose elastic yield under load can be limited as a function of the acting loads.

According to the invention, this goal is obtained through the fact that at least one inwardly directed projection is formed in at least one section of the wall of the inner casing and by the fact that this projection is dimensioned with respect to its inwardly protruding height such that it lies against the rod or at least is supported against the rod upon loading of the roller race.

An inner casing with such a projection reacts in a less yielding manner under load without, however, losing its elasticity, which, e.g., is necessary for ensuring play-free support. The stiffness of such an inner casing can be controlled via the shape of the projection. A projection which lies against the surface of the rod already in the unloaded state of the inner casing leads to an inner casing which reacts relatively stiffly under load. A projection which does not yet make contact in the unloaded state of the casing permits a certain amount of cushioning up to its bottoming (necessary for play-free support) only to then form a rigid stop. A casing provided with such a design will react less stiffly and will further exhibit a more elastic behavior. The elastic behavior of the inner casing can thus be controlled as required by its application via the height of the projection. Errors in shift cycles developing as a result of the elasticity of the inner casing can thus be appropriately controlled.

It was already mentioned above that the inner casings are not only employed for play-free securing of longitudinally moveable rods, but also in other conceivable applications such as, e.g., bearings with play. In the case of bearings exhibiting play, one attains with an inner casing according to the present invention a good cushioning effect of the bearing in the case of shock or vibrational loads, on the one hand, and good stiffness, e.g., under constant load, on the other.

In further embodiments of the present invention, the projection is formed by an inwardly bent flange at least partially stamped from the material of the wall sections and the inner casing is formed by a sheet-metal piece cut and shaped from sheet material. Such inner casings can be mass-produced at relatively low cost. The introduction of the projection can be integrated in the process of cutting and shaping the casing without involving substantial additional costs.

A further embodiment of the present invention relates to an inner casing which additionally exhibits a continuous slot running in the longitudinal direction as well as at least one roller race on each of three sections, one of the roller races being formed on a section opposite the slot and each of the free ends of the inner casing bordering the slot on both sides engaging at least partially in a corresponding recess in the rod. In addition, the wall of the inner casing is at least partially pretensioned inwardly, and the opposing sections of the wall each exhibit an opening running in the longitudinal direction. The cage guiding the rollers engages at least partially into this opening in order to limit its axial travel. With such a design of the inner casing, one provides that the projection starts from the edge of the opening and that the projection is formed at least partially from the material of the inner casing which is dislodged from the sections in forming the opening. The advantage of such a construction lies especially in the cost savings involved in the production of the inner casing. The projection is cut out simultaneously with the forming of the opening and then directed inwardly.

BRIEF DESCRIPTION OF THE DRAWINGS

The invention is explained below on the basis of a preferred embodiment. In the drawings.

DETAILED DESCRIPTION OF THE PREFERRED EMBODIMENT

Figure 1:
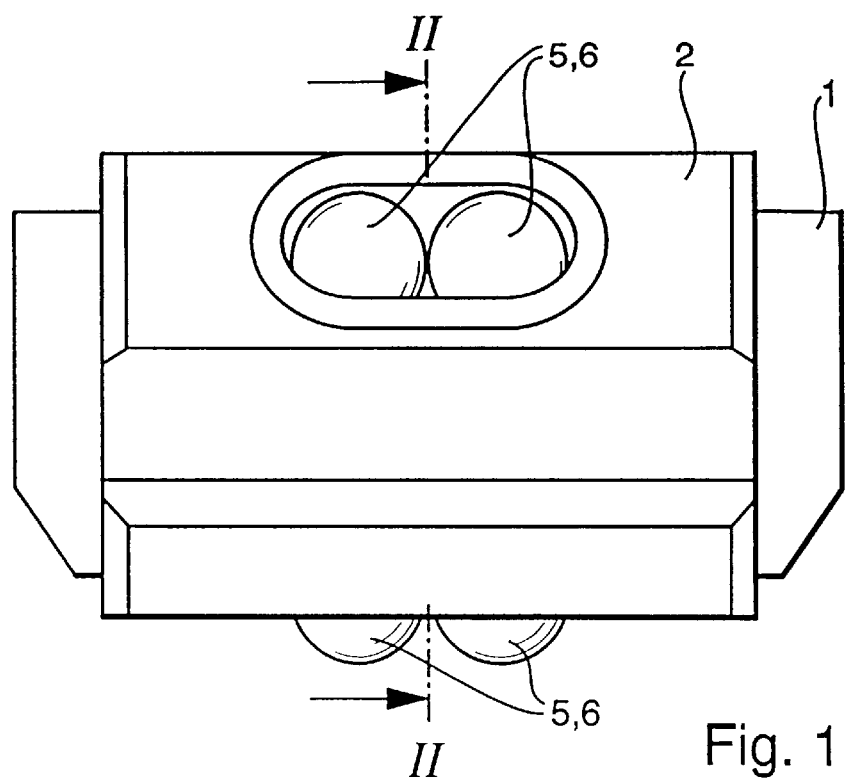
FIG. 1 is a main view of an embodiment of an inner casing including a ball-guiding cage.
Figure 2:
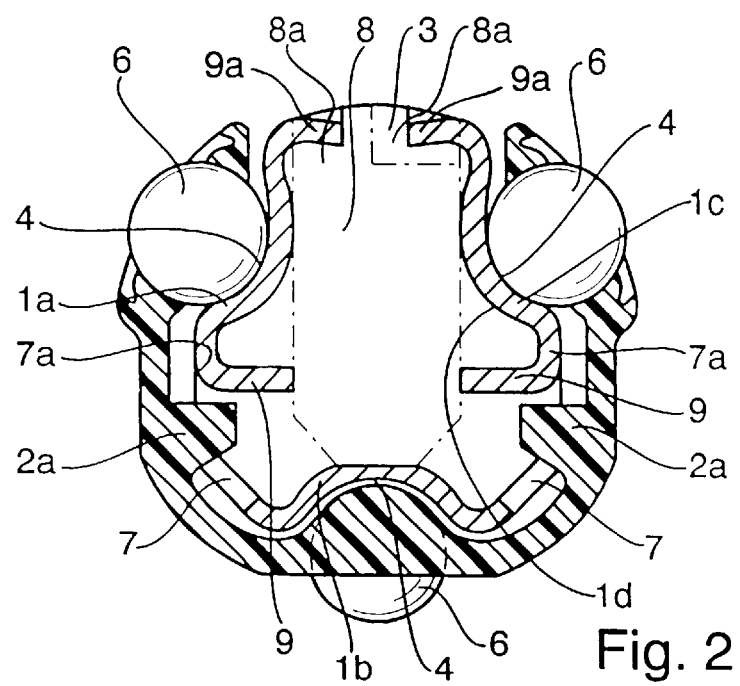
FIG. 2 is a longitudinal section through the inner casing of FIG. 1 taken along line II.

FIG. 1 and FIG. 2 show an inner casing 1 which is partially surrounded by a cage 2. The inner casing 1 exhibits a longitudinally continuous slot 3. A roller race 4 is formed in each of the sections 1a, 1b, and 1c of wall 1d. Each roller race 4 holds a series of rollers which are guided by cage 2. Each series of rollers 5 is formed by two balls 6. Section 1b lies opposite slot 3. The other two sections 1a and 1c are positioned opposite each other. Opposing sections 1a and 1c each exhibit an opening 7 extending in the longitudinal direction. A ridge 2a of cage 2 engages in opening 7. The inner casing 1 lies with its roller races 4 at least partially against the contour of a shift rod 8 shown dashed-lines in FIG. 2. The free ends 9a of inner casing 1 bordering slot 3 each engage in a recess 8a formed in shift rod 8 and secure inner casing 1 in its position on shift rod 8. From an edge 7a of each opening 7, a projection 9 extends radially inwardly and lies with its free end 9a against shift rod 8.

ELEMENT NUMBERS 1 inner casing
1a section
1b section
1c section
1d wall
2 cage
2a ridge
3 slot
4 roller race
5 rollers
6 ball
7 opening
7a edge
8 shift rod
8a recess
9 projection
9a free end

What is claimed is:

1. Inner casing of a rolling bearing permitting longitudinal movement over a limited travel path and designed for longitudinally displaceable mounting or guiding of a rod, the inner casing at least partially surrounding an outer contour of the rod and comprising an elastic wall with a continuous slot running in a longitudinal direction, with free ends of the inner casing bordering the slot on both sides engaging at least partially in a corresponding recess, the wall having at least one raceway extending in a longitudinal direction of the rod on each of at least two sections, such that rolling elements are adapted to act from outside on each raceway, and the wall and the raceway having a cushioning effect at least upon loading at least in a direction of the rod or lying at least partially against the rod, and at least one inwardly directed projection formed on at least each of the two opposing sections of the wall, each of the projections is formed at least partially from material of the inner casing, and each of the projections being dimensioned with respect to an inwardly protruding height such that it is adapted to lie against the rod or at least is supported against the rod upon loading of the raceway.

2. Inner casing according to claim 1, wherein the wall is at least partially pretensioned against the rod and at least one of the projections starts from an edge of an opening and the projection is formed at least partially from material of the sections which is dislodged from the sections in forming the opening.

3. Inner casing according to claim 2, wherein the opening is adapted to at least partially receive a portion of a cage guiding the rolling elements.

4. Inner casing according to claim 1, wherein the inner casing is formed by a sheet metal piece cut and shaped from sheet metal.

* * * * *